United States Patent
Ganev et al.

(10) Patent No.: US 7,488,921 B2
(45) Date of Patent: Feb. 10, 2009

(54) ADAPTIVE STARTUP CONTROL METHOD FOR ELECTRIC DRIVES

(75) Inventors: Evgeni Ganev, Torrance, CA (US); Dennis M. Morita, Rancho Palos Verdes, CA (US); Michael A. Quan, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 160 days.

(21) Appl. No.: 11/364,525

(22) Filed: Feb. 27, 2006

(65) Prior Publication Data

US 2007/0210071 A1 Sep. 13, 2007

(51) Int. Cl.
*H05B 1/02* (2006.01)

(52) U.S. Cl. ............... 219/505; 219/497; 219/501; 307/117

(58) Field of Classification Search ......... 219/505, 219/504, 494, 491, 497, 501, 507–509; 307/117, 307/39–41
See application file for complete search history.

(56) References Cited

U.S. PATENT DOCUMENTS 5,909,108 A * 6/1999 He et al. ................. 323/225
6,772,603 B2 * 8/2004 Hsu et al. ................ 62/259.2
2004/0124808 A1 * 7/2004 Hirono .................... 318/806
2005/0253165 A1 * 11/2005 Pace et al. ............... 257/139

* cited by examiner

Primary Examiner—Mark H Paschall
(74) Attorney, Agent, or Firm—Oral Caglar, Esq.

(57) ABSTRACT

A controlled start up technique may eliminate the excessive peak junction temperature by controlling the speed of the electric device. Lower speed may result in reduced power to the load. Reduced power may result in reduced losses to maintain reliable operating junction temperatures. Once the junction reaches the predetermined temperature limit, speed may be controlled to hold the junction temperature constant. As time elapses, the coolant temperature may reduce, thereby allowing a higher power level without an increase in IGBT temperature. Unlike conventional methods which may allow for full power continuously upon start up, thereby either potentially causing a high temperature shut-down condition or requiring additional thermal inertia to handle a high heat load due to a continuous full-power start up, the controlled start up eliminates the design penalties for extensive thermal enhancements to accommodate the occasional extreme hot start up.

17 Claims, 5 Drawing Sheets

ADAPTIVE STARTUP CONTROL METHOD FOR ELECTRIC DRIVES

BACKGROUND OF THE INVENTION

The present invention generally relates to an adaptive startup control method (ASCM) and, more specifically, to an ASCM for electric drives applicable to force-cooled electric power electronics.

The power electronics for aerospace applications plays a significant role in the modern aircraft and spacecraft industry. This is particularly true in the area of more electric architecture (MEA) for aircraft and military ground vehicles.

The commercial aircraft business is moving toward non-bleed air environmental control systems (ECS), variable-frequency (VF) power distribution systems and electrical actuation. Typical examples include the latest designs, such as the Boeing 7E7 and the Airbus jumbo A380. The next-generation Boeing airplane, Y1 (replacement of 737), and the Airbus airplane A1 (replacement of A320), will most likely use MEA. Some military aircraft already utilize MEA, including primary and secondary flight control. Military ground vehicles have migrated toward hybrid electric technology where the main propulsion is electric drives. Therefore substantial demand for power utilization has arisen.

Resulting from these tendencies is a significant increase in power conversion needs. Non-bleed ECS's need additional electric drives for vapor cycle system (VCS) compressors, condenser fans and liquid pumps. A large number of electric drives for fans are required. In constant-frequency applications, these fans have used predominately direct drive (no power electronics) to an induction machine. In the new environment, a double power electronics conversion AC to DC and DC to AC is required. Auxiliary power unit (APU) and main engine electric start imposes a need for high-power, multiple-use controllers. Military aircraft require high-voltage (270-Vdc) power conversions multiple times. This is from generation, to electric flight controllers and utilization. Future Combat Systems (FCS) have moved toward high voltage power distribution system where high-power propulsion and generation are being used.

In this environment, it is obvious that there is a need for power converters and motor controllers for aircraft and ground military businesses for increased power levels conversion capabilities to handle increased loads; reduced controller weights to be able to accommodate large content increase per platform; reduced volume to accommodate electronics housings in limited compartments space; increased reliability for achieving reasonable mission success; and reduced cost for affordability.

The power range for power conversion and motor control units varies from hundreds of watts to hundreds of kilowatts. The efficiency of these converters varies from 80 to 97%. Therefore, heat rejection from 3 to 20% of the total converted power is required. For power conversion levels above several kilowatts, forced cooling is typically needed to achieve acceptable power density levels. The forced cooling is either air or liquid. The proper utilization of the coolant flow is achieved by using special devices called cold plates both for liquids and for air.

Electric drives as a part of an ECS, or those in close proximity with an ECS, can benefit from using low-temperature coolants. However, the low temperature coolant may not become available immediately after starting up the system. It typically takes several minutes until the fluid temperature reduces to its steady-state level. At the same time, the electric drives are expected to start operation quickly at full or reduced load conditions. This is particularly valid for the vapor cycle system (VCS) compressor controller, since the ECS readiness and coolant availability are dependent on the compressor speed.

The highest temperature levels of the semiconductor devices of the power electronics will usually occur during a worst-case startup consisting of a non-operating soak to high temperatures without coolant. This may occur, for example, while an aircraft is on the ground with high (55-85° C.) surrounding temperatures. Upon startup, the coolant flow starts immediately, but the coolant temperature could still be very high. Therefore, a temperature spike would occur during initial startup of the system.

Referring to FIG. 1, there is shown a conventional motor control scheme 100 that can be realized by either analog electronics or high performance digital signal processor (DSP). High end products will generally use a sensorless control option to reduce system cost and improve reliability, while analog and digital hardwired controllers are attractive when software expenses are unacceptable.

An outer speed loop 102 may be wrapped around an inner current/torque loop 104 and the controller may be allowed to operate at full limits until the inverter baseplate temperature exceeds a predetermined value, at which time the controller is disabled as shown at 106. This type of design allows a maximum speed command without regard to the environmental conditions of the controller until loss of coolant or excessive duty cycle causes the power inverter baseplate temperature 108 to exceed the safe value.

Most controllers have a full-power operational mode, after a "hot soak" period (that is, a period of time in which the coolant is allowed to take on the temperature of its surroundings), which, in general, produces the worst-case operation thermally for most of the active power components. Continuous operation of the controller will bring a gradual cool-down of the cooling medium to the steady-state condition. Controllers designed for this type of operation will generally use their "thermal inertia (mass)" to limit the maximum junction temperatures of the active devices to a safe value. The thermal inertia is generally proportional to the weight (i.e. mass) of the object. For many applications, the need to minimize weight may be an important consideration.

Due to its high power density, the isolated gate bipolar transistor (IGBT) module is designed to closely follow the temperature of its mounting surface (usually the cold plate carrying the coolant). The IGBT device and its included junctions have a relatively short thermal time constant relative to the several minutes required for the coolant to reach its normal steady-state temperature after being "soaked" to a higher non-operating temperature environment.

Referring now to FIG. 2, there is shown a representation of the thermal curves for a coldplate-mounted IGBT module installed on a high-performance, air-cooled coldplate. After soaking to 85° C., the module is loaded at 100 percent power while the coolant temperature ramps from its initial 85° to 9° C. over a two-minute period. The low thermal inertia IGBT junctions 110 jump to a steady-state temperature above the IGBT case 112 and continue to rise as the component case 112 and heat sink 114 absorbs the dissipated power. When the coolant temperature 116 reduces sufficiently to handle the total power, component and junction temperatures 110 peak and then fall to their designed steady-state temperature limits 118. For the case shown in FIG. 2, the peak IGBT junction temperature exceeds the 150° C. rating for the component, which is unacceptable.

A more expensive, heavier, or more complex thermal design would be necessary to address the over temperature shown in FIG. 2. The design is more than adequate for steady-state operation and even hot startups provided the "soak" temperature is about 20° C. less extreme that the 85° C. used in this example.

As can be seen, there is a need for a new adaptive startup control method for electric drives with improved performance and reduced cost. This new adaptive startup control method should minimize the startup time of the system while, at the same time, maintain the semiconductor temperatures at a safe level.

SUMMARY OF THE INVENTION

In one aspect of the present invention, a startup control method for electric drives, the method comprises initially starting the electric drive at full performance; determining a junction temperature; comparing the junction temperature to a predetermined limit temperature; and reducing the performance of the electric drive when the junction temperature is approaching the predetermined limit temperature, thereby limiting the junction temperature to the predetermined limit temperature.

In another aspect of the present invention, a method for protecting power electronics from thermal overload, the method comprises determining a junction temperature; comparing the junction temperature to a predetermined limit temperature, the predetermined limit temperature being at or below electronics' temperature rating; and reducing the performance of the electronics when the junction temperature is approaching the predetermined limit temperature, thereby limiting the junction temperature to the predetermined limit temperature.

In yet another aspect of the present invention, a method for maintaining a temperature of power electronics below a predetermined value, the method comprises determining a junction temperature; comparing the junction temperature to a predetermined limit temperature, the predetermined limit temperature being at or below electronics' temperature rating; and reducing at least one of the speed command and the current command delivered to the electronics when the junction temperature is approaching the predetermined limit temperature, thereby limiting the junction temperature to the predetermined limit temperature.

In a further aspect of the present invention, a startup control scheme for electric drives comprises an inverter baseline temperature limiting function; an outer speed loop; and an inner current/torque loop, wherein the inverter baseline temperature limiting function controls at least one of the speed command and the current command delivered to the electronics when a junction temperature is approaching a predetermined limit temperature, thereby limiting the junction temperature to the predetermined limit temperature.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a controlled start up technique that may eliminate the excessive peak junction temperature by controlling the speed of the electric device. Lower speed may result in reduced power to the load. Reduced power may result in reduced losses to maintain reliable operating junction temperatures. Once the junction reaches the predetermined temperature limit, speed may be controlled to hold the junction temperature constant. As time elapses, the coolant temperature may reduce, thereby allowing a higher power level without an increase in IGBT temperature. Unlike conventional methods which may allow for full power upon start up, thereby either potentially causing a high temperature shut-down condition or requiring additional thermal inertia to handle a high heat load due to a full-power start up, the controlled start up eliminates the design penalties for extensive thermal enhancements to accommodate the occasional extreme hot start up. The startup method and scheme of the present invention may be useful in modern aircraft, spacecraft and ground vehicle technologies.

As used herein, the terms "first," "second" and so forth, herein do not denote any order, quantity, or importance, but rather are used to distinguish one element from another, and the terms "a" and "an" herein do not denote a limitation of quantity, but rather denote the presence of at least one of the referenced item.

Figure 3:
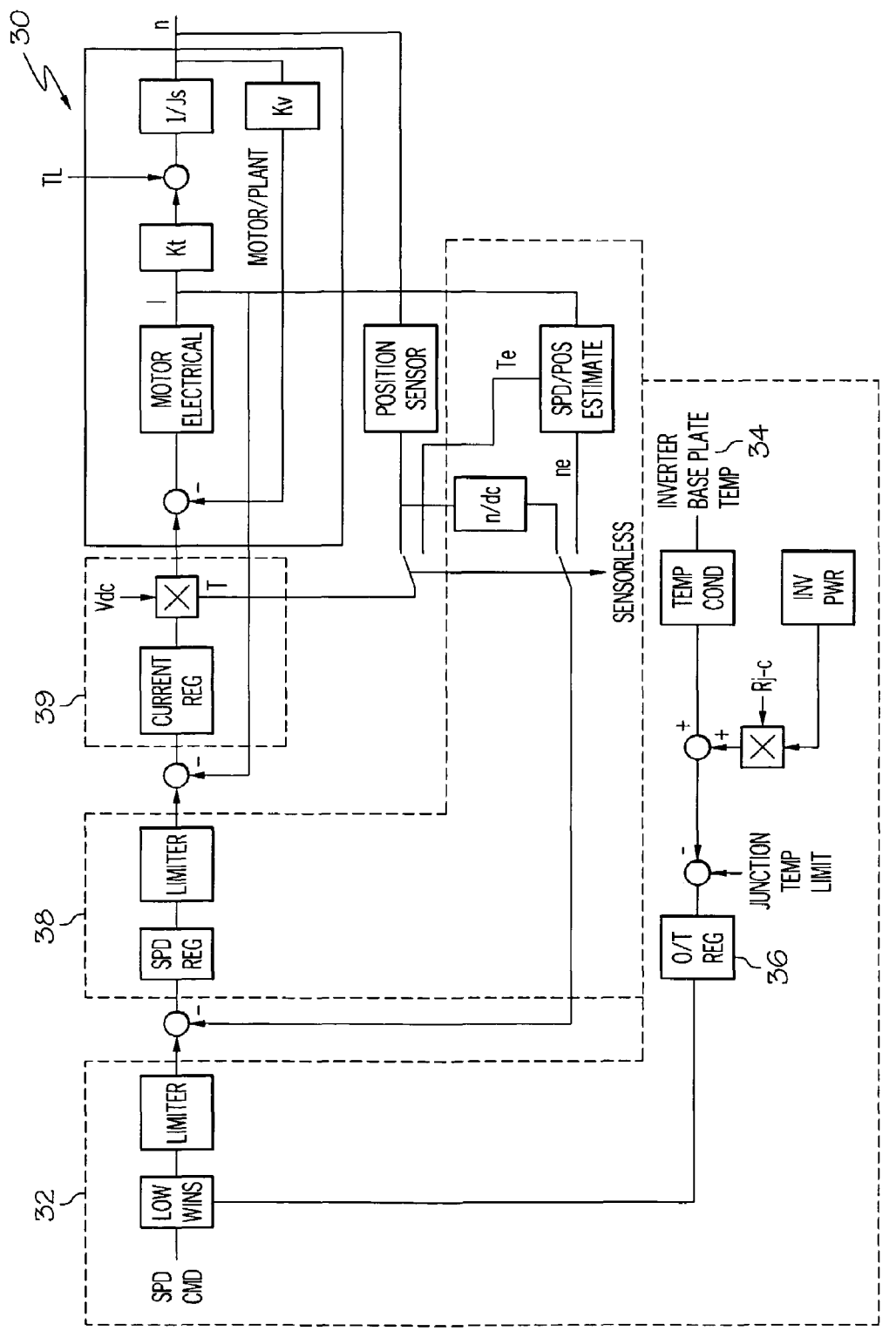
FIG. 3 shows a motor control scheme with controlled startup according to an embodiment of the present invention.

Referring to FIG. 3, there is shown a top-level motor control scheme 30 having an outer speed loop 38 wrapped around an inner current/torque loop 39 having an inverter baseplate temperature limiting function 32. This control scheme 30 may allow for full performance of the controller until the inverter base temperature 34 tries to exceed a predetermined limit, at which time the performance (via speed command 36) may be lowered to keep the inverter base plate temperature 34 from exceeding the safe limits. The reason for the rising temperature may be a high initial heat sink temperature "hot soak start," low/no coolant flow or duty cycles outside of the specification.

Systems that can afford a slight degradation of performance for the "hot soak" start may be able to appreciate "controlled maximum power" to the load while waiting for the coolant temperature to drop. This control may reduce the controller thermal inertia required to survive the normal thermal transient spike generally associated with this type of operation. As the temperature of the coolant drops, which in turn reduces the heat sink temperature, the control loop (inverter baseplate temperature limiting function 32) may raise the speed to the desired speed. One goal of the control scheme 30 is to provide a limit to the junction temperature to a predetermined level. However, junction temperature direct measurement may not be easy to achieve. There is no evidence for successful practical implementation of direct junction temperature measurement. Therefore, a junction temperature ($T_{junction}$)_estimator may be implemented to calculate real time temperature. The scheme 10 may use baseplate temperature measurement $T_{bp}$, real-time inverter losses calculation $P_{inv\ los}$, and thermal resistance junction to baseplate $R_{j-bp}$. See formula 1.

$$T_{junction} = T_{bp} + P_{inv\ los} * R_{j-bp}. \quad (1)$$

The inverter loss can be defined based on the incoming dc power to the inverter calculated from bus voltage $V_{inv}$ and current $I_{inv}$, and inverter efficiency Eff. See formula 2.

$$P_{inv\ los} = V_{inv} * I_{inv} * \text{Eff} \quad (2)$$

Figure 1:
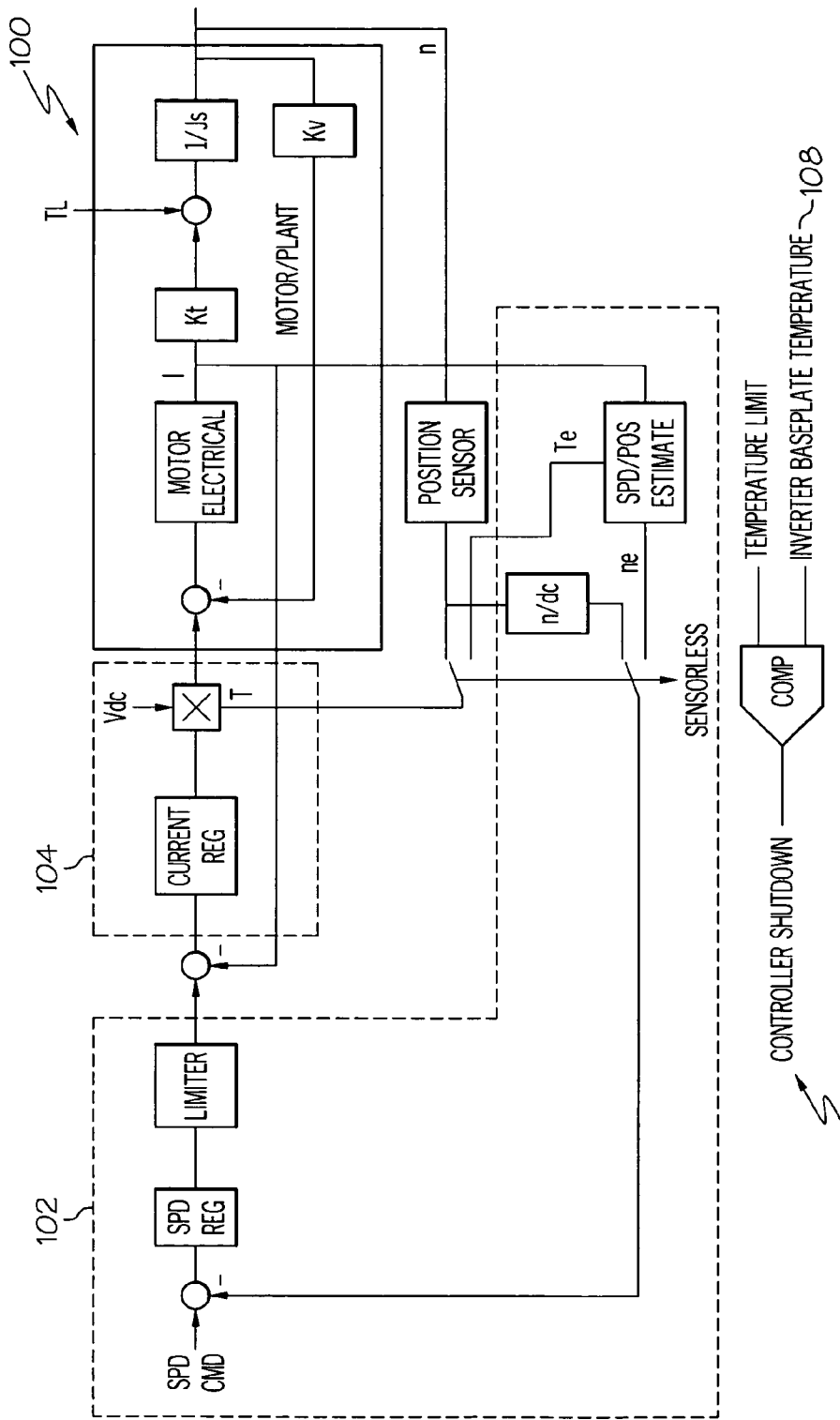
FIG. 1 shows a conventional motor control scheme.
Figure 2:
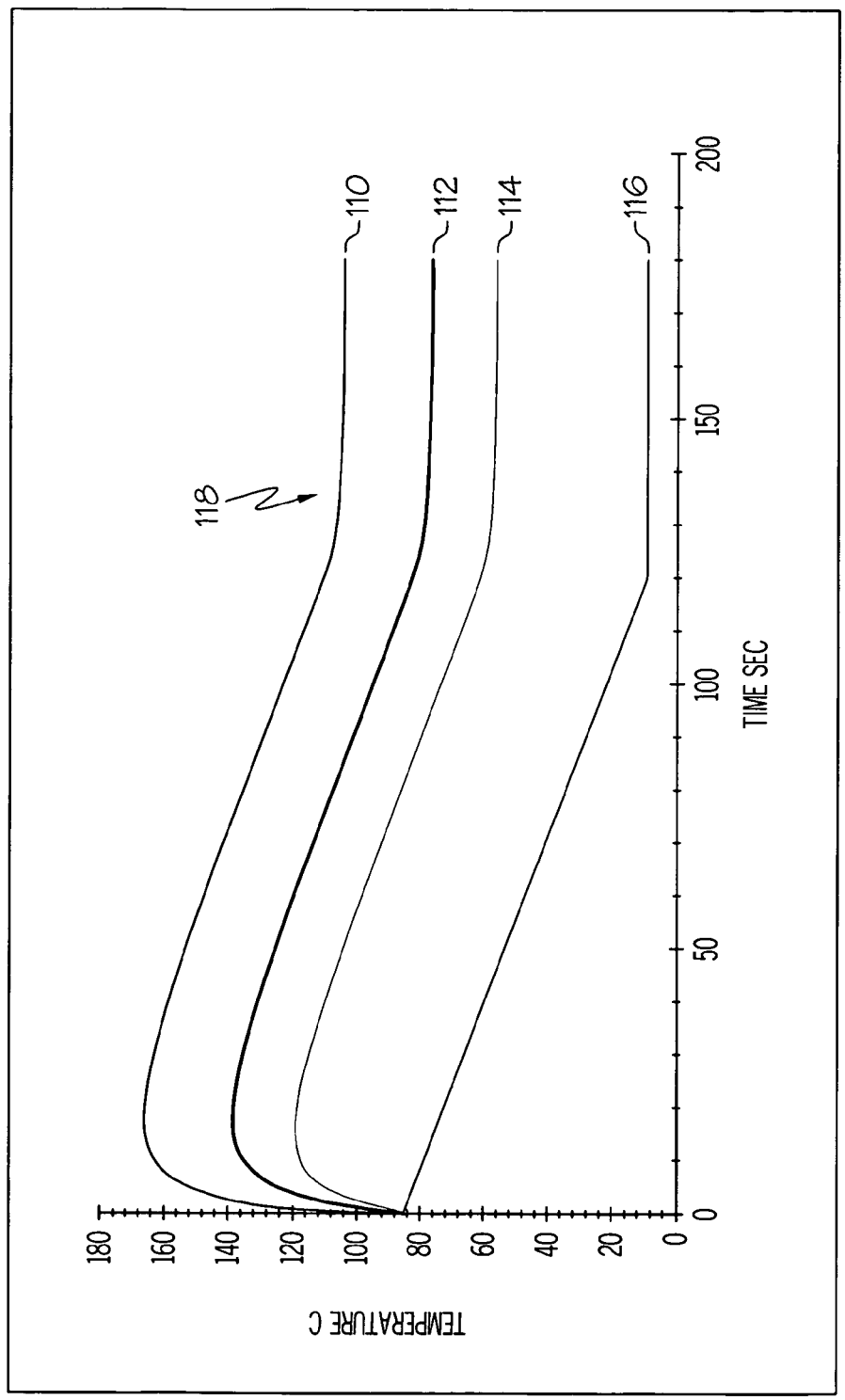
FIG. 2 shows thermal curves for the conventional motor control scheme of FIG. 1.

The controlled motor startup scheme 30 may eliminate the excessive peak junction temperature that was shown in the conventional scheme of FIG. 1 by controlling the power as necessary to maintain reliable operating junction temperatures.

Figure 4:
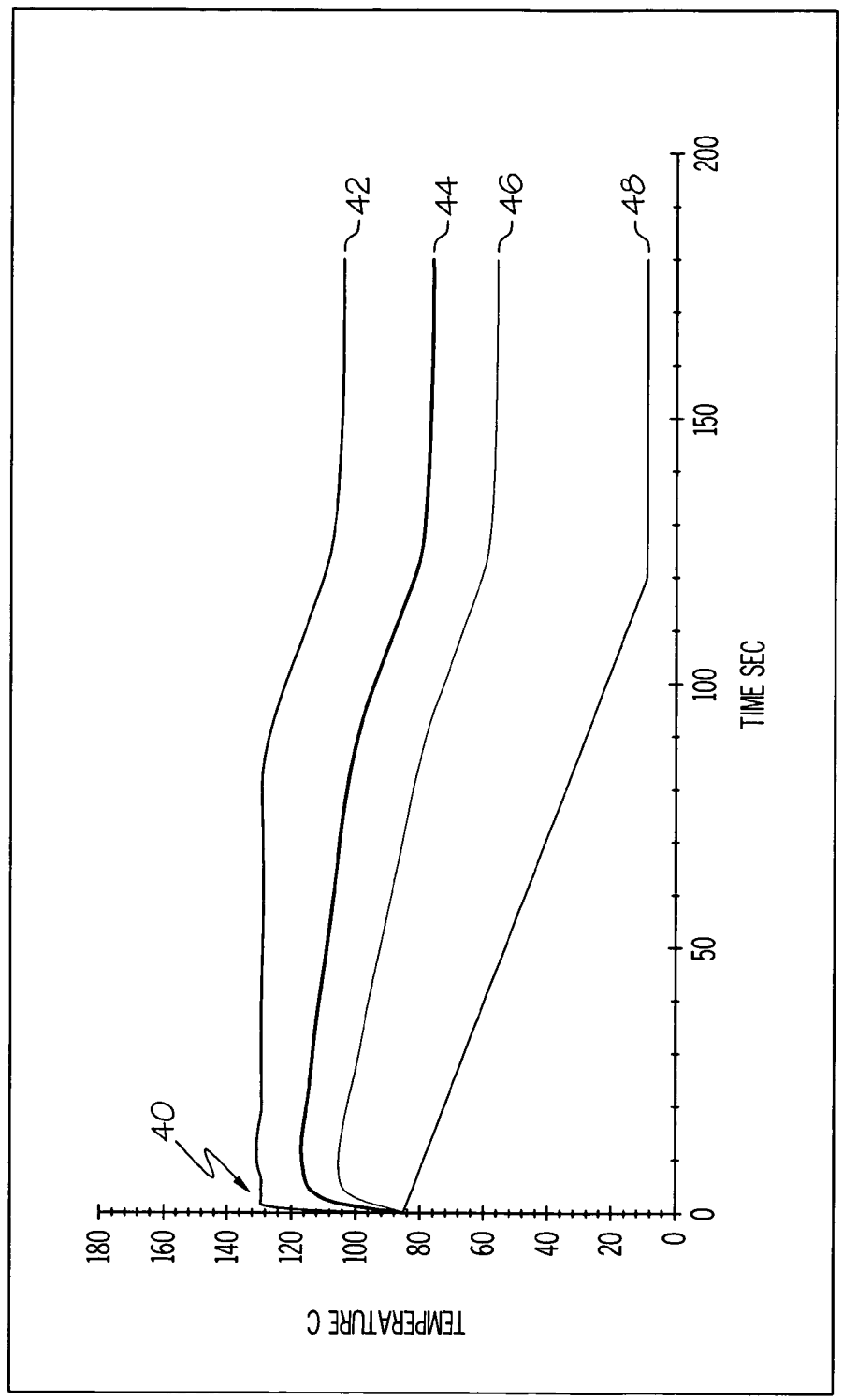
FIG. 4 shows thermal curves for the motor control scheme with controlled startup of FIG. 3.

Referring to FIG. 4, there are shown thermal curves for the controlled start up according to the present invention. For the data in FIG. 4, the same startup conditions were used that were used for the conventional system of FIG. 1 (After soaking to 85° C., the module is loaded at 100 percent power while the coolant temperature ramps from its initial 85° to 9° C. over a two-minute period.) Here, the junction temperature was controlled to 130° C. for a 150° C. rated device, however a higher controlled temperature might be allowed depending on the application.

As shown in FIG. 4, once the junction 42 reached the predetermined temperature limit 40 (in this case, 130° C.), power was reduced to hold the junction temperature constant. As time increased, the coolant temperature 48 reduced, allowing a higher power level for the IGBT without an increase in IGBT temperature. The larger temperature difference between the junction 42 and the case 46 as time increases may reflect the high IGBT power being dissipated through the heatsink 44. The controlled startup may eliminate the design penalties for extensive thermal enhancements to accommodate the occasional "extreme" hot startup.

Figure 5:
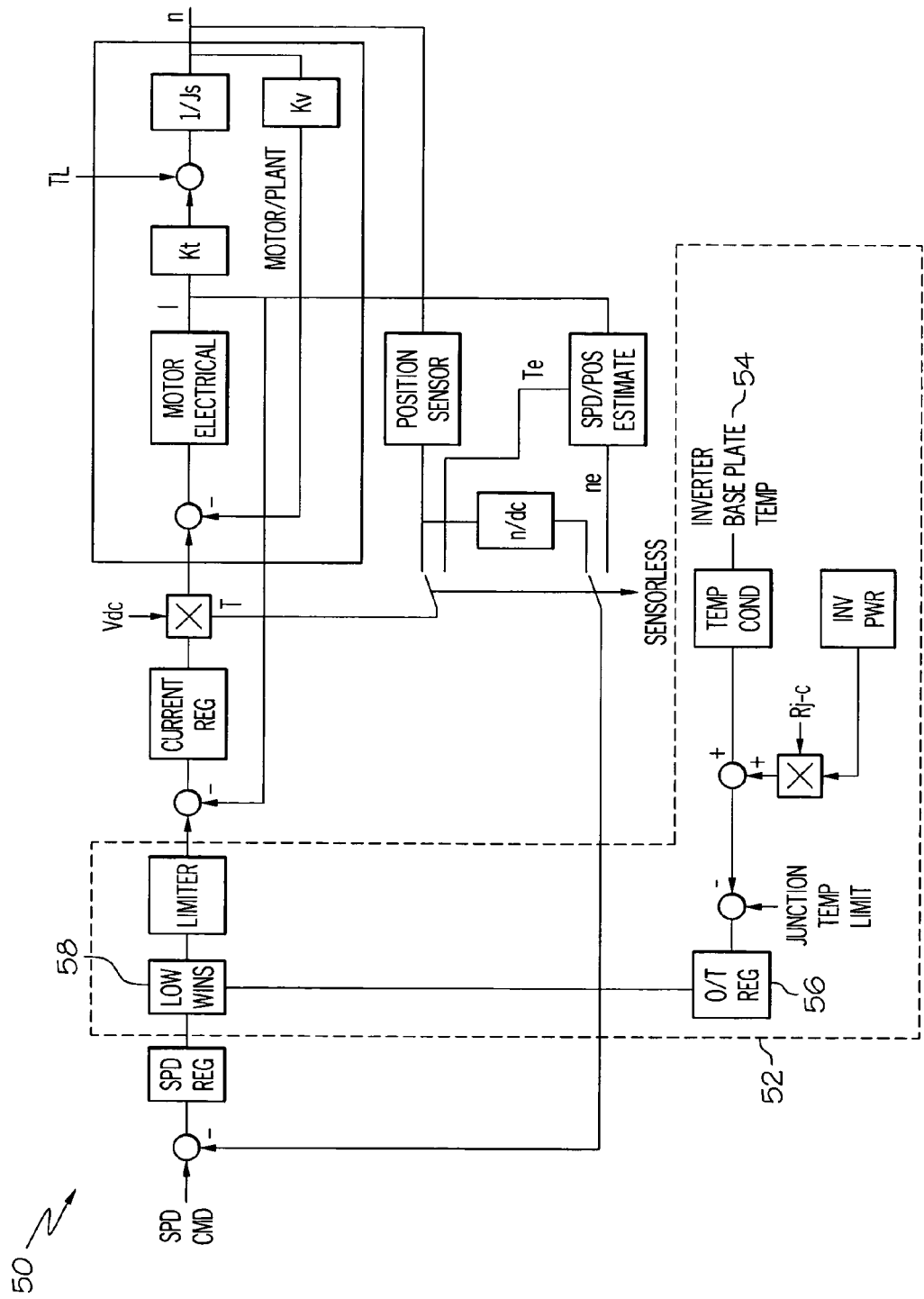
FIG. 5 shows a motor control scheme with controlled startup according to an alternate embodiment of the present invention.

Referring now to FIG. 5, there is shown an alternative control design 50. The baseplate temperature limiting function 52 may be inserted in the torque/current loop for a more direct acting temperature limiting operation. The power dissipation of the power inverter may be predominantly a function of load current, assuming a constant inverter modulation frequency, which may be a major source of heat in the controller.

The controller 50 may have full capability (speed and current) as long as the inverter baseplate temperature 54 is less than the predetermined limit. Conditions that may raise the baseplate temperature may be controlled by the overtemperature regulator 56 through the "low wins" 58 and may reduce the controller current command, which results in lower controller power dissipation.

This control scheme may provide a faster response to the system to maintain the desired junction temperature. However, in this alternative embodiment of the present invention, shaft speed may have more fluctuations.

The ASCM of the present invention may exhibit several advantages as compared to conventional systems. For example, the ASCM of the present invention may have a reduced weight due to an optimized startup process. The ASCM of the present invention does not need to use devices with additional thermal inertia to smear the initial thermal spike. As a result of this reduced weight, and the lack of need of additional thermal inertia, there may be a reduced cost due to the reduced weight of the ASCM.

Furthermore, the ASCM of the present invention may result in improved operability over conventional systems. Unlike conventional systems which may shut down when critical power module temperature is achieved, the ASCM of the present invention may cause the controller speed to decrease to reduce power loses. Hence, the ASCM is still operating with reduced performance rather than shutting down completely.

The control approach of the present invention may allow for optimized adaptive startup at different environments. When the initial temperature is low, for example, the system may start up quickly, with no additional delay. When the initial temperature is high, however, the startup may be delayed due to an excessive initial temperature spike. The junction temperature of the power modules may be maintained just below the safe levels.

It should be understood, of course, that the foregoing relates to exemplary embodiments of the invention and that modifications may be made without departing from the spirit and scope of the invention as set forth in the following claims.

We claim:

1. A startup control method for electric drives, the method comprising:
    initially starting the electric drive at full performance;
    determining a junction temperature;
    comparing the junction temperature to a predetermined limit temperature;
    lowering at least one of a speed command to the electric drive and a current command to the electric drive to reduce the performance of the electric drive when the junction temperature is approaching the predetermined limit temperature;
    holding the junction temperature at the predetermined limit temperature by raising or lowering the performance of the electric drive until a coolant for the electric drive is adequate for full performance thereof; and
    raising the performance of the electric drive up to full power when the junction temperature is lowered below the predetermined limit temperature.

2. The method according to claim 1, further comprising measuring an inverter base plate temperature.

3. The method according to claim 2, further comprising measuring real-time inverter losses.

4. The method according to claim 3, wherein the junction temperature is estimated using the formula $$T_{junction} = T_{bp} + P_{inv\ los} * R_{j-bp}$$

wherein $T_{junction}$ is the estimated junction temperature, $T_{bp}$ is the baseplate temperature measurement, $P_{inv\ los}$ is the real-time inverter loss and $R_{j-bp}$ is the thermal resistance junction to baseplate.

5. The method according to claim 4, wherein the real-time inverter loss, Pinv los, is calculated from the formula $$P_{inv\ los} = V_{inv} * I_{inv} * \mathit{Eff}$$

wherein $V_{inv}$ is the bus voltage, $I_{inv}$ is the bus current and Eff is the inverter efficiency.

6. The method according to claim 1, further comprising circulating and cooling a coolant through a heat sink.

7. A method for protecting power electronics from thermal overload, the method comprising:
    determining a junction temperature;
    comparing the junction temperature to a predetermined limit temperature, the predetermined limit temperature being at or below a temperature rating of the power electronics; and
    reducing the performance of the power electronics when the junction temperature is approaching the predetermined limit temperature;
    holding the junction temperature at the predetermined limit temperature by raising or lowering the performance of the electric drive until a coolant for the electric drive is adequate for full performance thereof; and increasing the performance of the power electronics when the junction temperature is cooled below the predetermined limit temperature.

8. The method according to claim 7, further comprising:
measuring an inverter base plate temperature; and
measuring real-time inverter losses.

9. The method according to claim 8, wherein the junction temperature is estimated using the formula $$T_{junction} = T_{bp} + P_{inv\ los} * R_{j-bp}$$

wherein $T_{junction}$ is the estimated junction temperature, $T_{bp}$ is the baseplate temperature measurement, $P_{inv\ los}$ is the real-time inverter loss and $R_{j-bp}$ is the thermal resistance junction to baseplate.

10. The method according to claim 9, wherein the real-time inverter loss, $P_{inv\ los}$, is calculated from the formula $$P_{inv\ los} = V_{inv} * Eff$$

wherein $V_{inv}$ is the bus voltage, $I_{inv}$ is the bus current and Eff is the inverter efficiency.

11. The method according to claim 7, wherein the performance of the electric drive is reduced by lowering at least one of the speed commands to the power electronic or the current command to the power electronic.

12. A method for maintaining a temperature of power electronics below a predetermined value, the method comprising:
determining a junction temperature;
comparing the junction temperature to a predetermined limit temperature, the predetermined limit temperature being at or below electronics' temperature rating; and
reducing at least one of the speed command and the current command delivered to the electronics when the junction temperature is approaching the predetermined limit temperature;
holding the junction temperature at the predetermined limit temperature holding the junction temperature at the predetermined limit temperature by raising or lowering the performance of the electric drive until a coolant for the electric drive is adequate for full performance thereof; and increasing the performance of the electronics when the junction temperature is cooled below the predetermined limit temperature.

13. The method according to claim 12, further comprising:
measuring an inverter base plate temperature; and
measuring real-time inverter losses.

14. The method according to claim 13, wherein the junction temperature is estimated using the formula $$T_{junction} = T_{bp} + P_{inv\ los} * R_{j-bp}$$

wherein $T_{junction}$ is the estimated junction temperature, $T_{bp}$ is the baseplate temperature measurement, $P_{inv\ los}$ is the real-time inverter loss and $R_{j-bp}$ is the thermal resistance junction to baseplate, and the formula $$P_{inv\ los} = V_{inv} * I_{inv} * Eff$$

wherein $V_{inv}$ is the bus voltage, $I_{inv}$ is the bus current and Eff is the inverter efficiency.

15. A startup control scheme for electric drives comprising:
an temperature limiting function;
an outer speed loop; and
an inner current/torque loop,
wherein the temperature limiting function controls at least one of a speed command and a current command delivered to the electric drives when a junction temperature is approaching a predetermined limit temperature, thereby holding the junction temperature at the predetermined limit temperature holding the junction temperature at the predetermined limit temperature by raising or lowering the performance of the electric drive until a coolant for the electric drive is adequate for full performance thereof, and wherein the temperature limiting function allows the speed command and the current command to be delivered to the electronics at full performance when the junction temperature is below the predetermined limit temperature.

16. The startup control scheme according to claim 15, wherein the temperature limiting function controls the speed command.

17. The startup control scheme according to claim 15, wherein the temperature limiting function controls the current.

\* \* \* \* \*